United States Patent [19]

Gross

[11] Patent Number: 4,705,969
[45] Date of Patent: Nov. 10, 1987

[54] HIGH ACCURACY TACHOMETER CIRCUIT

[75] Inventor: William H. Gross, Sunnyvale, Calif.

[73] Assignee: National Semiconductor Corporation, Santa Clara, Calif.

[21] Appl. No.: 909,385

[22] Filed: Sep. 19, 1986

[51] Int. Cl.[4] ............................................. G06G 7/20
[52] U.S. Cl. .................................. 307/519; 307/529; 307/525; 307/512; 328/144; 328/158; 324/166
[58] Field of Search ............... 307/512, 515, 525, 529, 307/519; 328/144, 158, 159; 364/730; 324/83 R, 166

[56] References Cited

U.S. PATENT DOCUMENTS

| 3,872,388 | 3/1975 | James | 307/519 |
| 4,088,960 | 5/1978 | Osborne | 328/144 |
| 4,506,174 | 3/1985 | Hitt | 328/144 |

FOREIGN PATENT DOCUMENTS

| 0624238 | 9/1978 | U.S.S.R. | 328/144 |
| 0661563 | 5/1979 | U.S.S.R. | 328/144 |

Primary Examiner—John S. Heyman
Attorney, Agent, or Firm—Gail W. Woodward

[57] ABSTRACT

A tachometer circuit is described that has a zero ripple d-c output that is directly proportional to the frequency. The circuit includes a pair of full wave rectifiers to act upon the sine and cosine signal inputs. The rectified currents are first squared, then summed together and finally the square root is taken. Since the quantity $\sqrt{sine^2+cosine^2}$ is a constant, there is no ripple and no output filtering is required to eliminate ripple. This means that the output can follow very rapid changes in frequency and no lag is introduced by the inclusion of low pass signal filtering.

4 Claims, 3 Drawing Figures

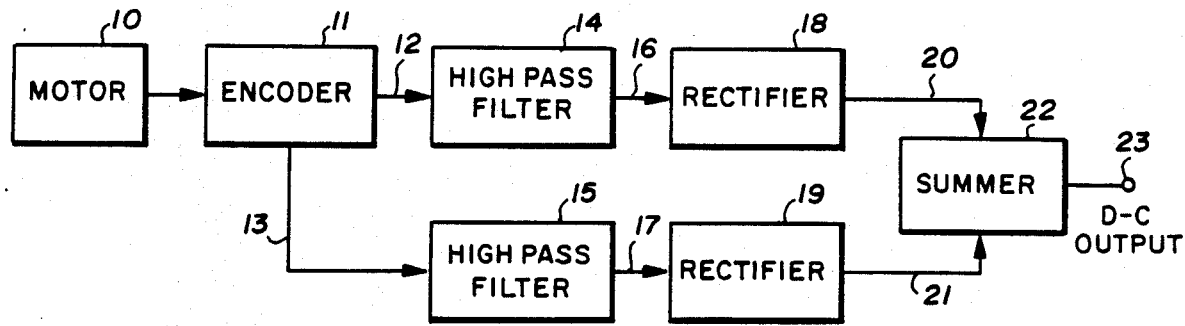
Fig_1 (PRIOR ART)
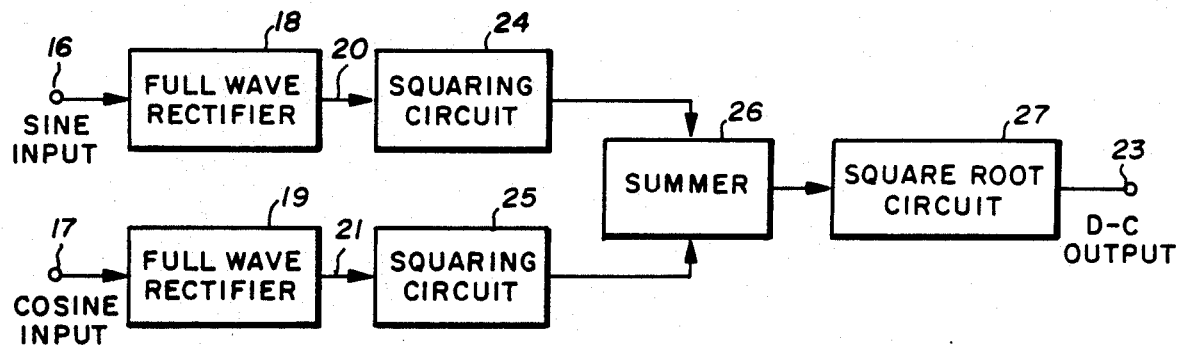
Fig_2

HIGH ACCURACY TACHOMETER CIRCUIT

BACKGROUND OF THE INVENTION

A circuit is disclosed for responding to the signals produced by a shaft position encoder to produce a d-c output that is accurately proportion to the shaft rotation rate. Prior art devices commonly employ detectors that require filtering to produce the d-c output. However, such filtering imposes a lag in the tachometer response speed. If the filtering is eliminated the detector output contains a ripple component that introduces an error into the output response.

U.S. Pat. No. 4,088,960 describes a correlation detector in which circuitry is employed to perform the function of the square root of the sum of the squares of two voltages developed by chopping an input signal. The circuitry involved is relatively complicated.

An article titled FREQUENCY DOUBLER GIVES PURE SINE WAVE appeared in the June 21, 1985, issue of Electronic Design. It presents a simple circuit that performs the function of combining a pair of inputs to produce the square root of the sum of the squares of the inputs. This circuit is readily integratable into conventional silicon monolithic, junction-isolated, integrated circuit (IC) structures.

FIG. 1 illustrates a block diagram of a typical prior art tachometer circuit. A motor 10 is coupled to drive an encoder which converts shaft position to an electrical signal. Typically encoder 11 produces a sine wave signal on line 12 and a cosine wave on line 13. These signals are a-c voltages that have a frequency related to motor shaft rotation. High pass filters 14 and 15 respectively feed these signals to rectifiers 18 and 19 via lines 16 and 17. While conventional filters are preferred at 14 and 15, simple differentiaters will perform the required function. Thus, the amplitudes of the signals on lines 16 and 17 will be a function of the motor shaft rotation rate.

The rectified signals on lines 20 and 21 are combined in summer 22 to provide a d-c output at terminal 23. This output is a d-c signal having a magnitude that is proportional to motor speed. Typically, rectifiers 18 and 19 are full wave devices which act as frequency doublers. Since the two signals applied to summer 22 are in quadrature, the d-c signal at terminal 23 will have a ripple of four times the encoder output frequency. This ripple has the effect of introducing an uncertainty into the d-c output. For the system shown the uncertainty will be about ±10%. This uncertainty can be reduced by including low pass filters in lines 20 and 21. If the low pass filters include capacitor inputs, rectifiers 18 and 19 are converted to peak rectifiers. Alternatively, a single low pass filter can be incorporated into the output of summer 22 in which case the filtered d-c is an average value. While the inclusion of a low pass filter will reduce the uncertainty of the d-c output the speed of response of the circuit will also be degraded. In effect, the filter produces a lag in the signal response. Where a rapid response is required, such a lag can be unacceptable. It would be desirable to provide a circuit that produces a pure d-c output that does not require filtering and avoids the inaccuracy imposed by output ripple.

SUMMARY OF THE INVENTION

It is an object of the invention to create a tachometer circuit which produces a pure d-c output without filtering.

It is a further object of the invention to create a tachometer circuit that produces a d-c output that can vary rapidly as a function of changes in input frequency and can be readily incorporated into an IC device.

These and other objects are achieved in a circuit as follows. Sine and cosine signals derived from a shaft position encoder are first full wave rectified to create direct currents related to these signals. Each one is applied to a circuit that first squares it and then adds the squared signals together. Then the square root is taken of the summed squares. This produces a direct current that has no ripple and is proportional to frequency. Thus, high accuracy is obtained without filtering and the level can follow rapidly varying frequency so that no lag is introduced into the tachometer.

BRIEF DESCRIPTION OF THE DRAWING

FIG. 1 is a block diagram of a typical prior art tachometer.

FIG. 2 is a block diagram of the tachometer of the invention.

DESCRIPTION OF THE INVENTION

Figure 3:
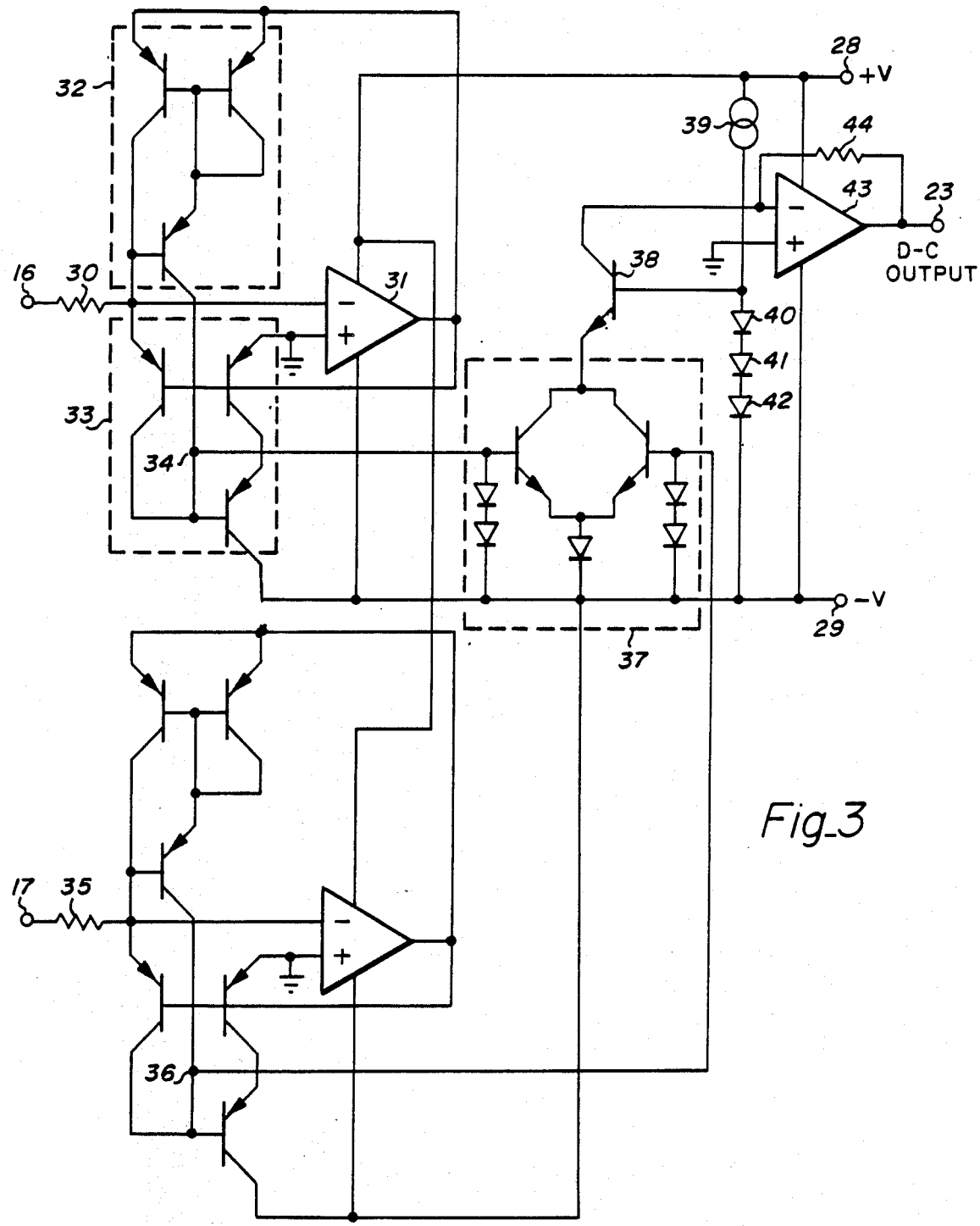
FIG. 3 is a schematic diagram of a circuit that will perform the functions of the block diagram of FIG. 2.

FIG. 2 is a block diagram of the circuit of the invention. The sine and cosine inputs, from the high pass filter, are applied to input terminals 16 and 17 respectively. Thus, the signals at lines 20 and 21 are the same as those for FIG. 1. Squaring circuits 24 and 25 receive the rectified a-c inputs and square the results which are summed at 26 and then applied to a square root circuit 27. This circuit performs the functions of the trigonometric identity:

$$(A \sin \omega T)^2 + (A \cos \omega T)^2 = A^2.$$

where
A = signal amplitude
$\omega$ = angular velocity ($2\pi F$)
T = time interval
This reduces to:

$$A = \sqrt{(A \sin\omega T)^2 + (A \cos\omega T)^2}$$

The final result is a pure d-c output having a magnitude proportional to angular velocity or frequency. Since there is no ripple, no filtering is required and the accuracy is high. The magniude of the d-c output can change rapidly so no lag is introduced into a system using the tachometer circuit.

FIG. 3 is a schematic diagram of a ciruit that will perform the functions of the block diagram of FIG. 2 and can easily be fabricated in IC form. A split power supply is connected between + terminal 28 and − terminal 29. The power supply mid-point is grounded.

Sine signal input terminal 16 is coupled via resistor 30 to the inverting input of operational amplifier (op amp) 31. The non-inverting input is grounded. The output of op amp 31 drives a pair of Wilson-type current mirrors 32 and 33 which have their inputs returned to the inverting input. Strictly speaking current mirror 33 is not a conventional Wilson circuit. The output current at node 34 for mirror 33 is the combined collector current of one transistor and the base current of a second transistor. Thus, the output current of node 34 will match the output current of mirror 32 which involves the collector and base current of a diode connected transistor. Therefore, mirrors 32 and 33 are functionally equivalent.

Current mirror 32 will conduct for the negative half cycle inputs and current mirror 33 will conduct for the positive half cycle inputs. This constitutes 100% negative feedback around op amp 31 so that it will drive its non-inverting input to ground level. Since the inverting input will be forced to ground, it will act as a low impedance circuit node. This means that an alternating current will flow in resistor 30 at a magnitude equal to the input voltage divided by the value of resistor 30.

Each of the two current mirrors 32 and 33 has its output coupled to circuit node 34. If the mirrors have unity gain the output at node 34 will be full wave rectified current pulses equal to the current pulses flowing in resistor 30. Node 34 will be a current source.

Cosine signal input terminal 17 feeds current to an identical circuit via resistor 35. The full wave rectified version of this input current appears at node 36 which will source the rectified current.

The elements inside dashed outline 37 represents the circuit referred to above as appearing in Electronic Design. This circuit will square the two inputs from nodes 34 and 36, add them together and then take the square root. The resulting output current is coupled to the emitter of transistor 38 which acts as a level shifting current repeater. The base of transistor is held at three diodes above -V by the action of current source 39 and diodes 40–42. The collector of transistor 38 will sink a current equal to that flowing in the output of circuit 37.

Op amp 43 has its output at terminal 23 coupled via resistor 44 to its inverting input to which the collector of transistor 38 is coupled. Thus, the inverting input of op amp 45 will be forced to ground and will act as a low impedance circuit node. The input drive current, flowing in transistor 38, will flow in resistor 44. This means that op amp 43 will produce an output voltage equal to the current in transistor 38 multiplied by the value of resistor 44. If resistor 44 is made equal in value to resistors 30 and 35. The output voltage at terminal 23 will be equal to the peak voltage at terminals 16 and 17. This output voltage is obtained by taking the square root of the sum of the input voltages squared and is therefore a constant d-c value having no ripple component. This makes the circuit very accurate and eliminates the need for filtering. The circuit therefore does not have its speed of response degraded by a low pass signal filter.

The invention has been described and a suitable embodiment detailed. When a person skilled in the art reads the foregoing description, alternatives and equivalents, within the spirit and intent of the invention, will be apparent. For example, the circuit functions of squaring, summing and taking the square root can be accomplished by other well-known circuit configuration. Accordingly, it is intended that the scope of the invention be limited only by the following claims.

I claim:

1. A tachometer circuit having sine and cosin signal inputs representative of the rotation rate of a shaft and said signal inputs have a frequency proportional to said rotation, said circuit comprising:
    means for making the amplitude of said sine and cosine signals proportional to frequency;
    means for rectifying each of said inputs;
    means for squaring each of said rectified signals;
    means for adding said squared signals together; and
    means for exracting the square root of said added together signals.

2. The tachometer circuit of circuit 1 wherein said means for rectification comprises full wave rectification.

3. The tachometer circuit of claim 2 wherein said means for rectification comprises:
    an operational amplifier having inverting and noninverting inputs and an output;
    a first current mirror having an input coupled between said operational amplifier output and said inverting input;
    a second current mirror having an input coupled between said operational amplifier output and said inverting input;
    means for returning said noninverting input to a source of reference potential; and
    means for coupling the outputs of said first and said second current mirrors together whereby a current is produced to represent the full wave rectified current supplied to said operational amplifier inverting input.

4. The method of producing a signal proportional to the frequency applied to a tachometer circuit receiving sine and cosine signal inputs comprising the steps:
    forming said sine and cosine signal inputs each to have a magnitude proportional to frequency;
    applying said sine and cosine signals each to a rectifier to produce sine and cosine rectified currents;
    applying said sine and cosine rectified currents to a squaring circuit to produce sine squared and cosine squared currents;
    adding said sine squared and said cosine squared currents together to produce a sum of squares current; and
    applying said sum of squares signal to a square root circuit to produce a d-c output that is proportional to the frequency of the sine and cosine signal inputs.

* * * * *